United States Patent [19]

Kawano

[11] Patent Number: 5,526,157

[45] Date of Patent: Jun. 11, 1996

[54] OPTICAL SUBMARINE CABLE SYSTEM

[75] Inventor: Keiji Kawano, Kawasaki, Japan

[73] Assignee: Fujitsu Limited, Kanagawa, Japan

[21] Appl. No.: 187,706

[22] Filed: Jan. 27, 1994

[30] Foreign Application Priority Data

Sep. 10, 1993 [JP] Japan .................................. 5-225928

[51] Int. Cl.[6] ................................................ H04B 10/14
[52] U.S. Cl. ............................................ 359/141; 359/109
[58] Field of Search ........................... 405/158; 359/141,
359/110, 151, 164, 109, 118, 119, 125,
137, 139; 385/24, 100, 115, 134–135

[56] References Cited

U.S. PATENT DOCUMENTS

| 4,313,224 | 1/1982 | Wakabayashi et al. | 359/110 X |
| 4,841,103 | 6/1989 | Oestretch | 359/141 X |
| 4,887,309 | 12/1989 | Anderson et al. | 359/110 |
| 5,093,886 | 3/1992 | Smoker et al. | 385/135 |
| 5,125,060 | 6/1992 | Edmundson | 385/135 X |
| 5,184,081 | 2/1993 | Oswald et al. | 324/533 |
| 5,214,312 | 5/1993 | Inoue | 307/43 |
| 5,231,687 | 7/1993 | Handley | 385/135 X |
| 5,334,879 | 8/1994 | Inoue et al. | 307/112 |
| 5,367,395 | 11/1994 | Yajima et al. | 359/110 |

FOREIGN PATENT DOCUMENTS

| 491378 | 6/1992 | European Pat. Off. | 359/141 |
| 109438 | 7/1982 | Japan | 359/141 |
| 019043 | 2/1983 | Japan | 359/141 |
| 266501 | 11/1987 | Japan | 385/139 |
| 221032 | 9/1989 | Japan | 359/141 |
| 100421 | 4/1992 | Japan | 359/141 |
| 173023 | 7/1993 | Japan | 385/135 |
| 061943 | 3/1994 | Japan | 359/141 |

Primary Examiner—Ramon S. Britts
Assistant Examiner—Frederick L. Lagman

[57] ABSTRACT

A optical submarine cable system having an optical cable comprised of a main optical fiber pair and a sub optical fiber pair; a branching joint box for separating the sub optical fiber pair into a first branching optical fiber pair and a second branching optical fiber pair; a redundant optical cable comprised of extended first and second branching optical fiber pairs; and an end box mounted at the end of the redundant optical cable, so that an expansion of the system and a maintenance and operation of the system are achieved by way of the end box.

10 Claims, 11 Drawing Sheets

OPTICAL SUBMARINE CABLE SYSTEM

BACKGROUND OF THE INVENTION

1. Field of the Invention

The present invention relates to a optical submarine cable system which is constructed by laying optical cables on a sea bottom.

Two systems are now available for constructing a long-distance communication system. One of the two systems is a satellite system which enables communication via a satellite. The other system is a optical submarine cable system which enables communication via the optical cables laid on a sea bottom. Among the two systems, the present invention relates to the latter optical submarine cable system. The optical submarine cable system provides a merit that high quality communication can be stably maintained.

2. Description of the Related Art

As will be explained hereinafter with reference to the accompanying figures, the prior art optical submarine cable system entails the following problems.

First, if it is required to expand the optical submarine cable system, there is a problem that a very high construction cost and also a very long construction period are needed for the system expansion.

Second, once a fault occurs in the optical submarine cable system, a large amount of work and a long period of time are needed from preparation for the repair work for the fault to a restart of usual operations.

SUMMARY OF THE INVENTION

Therefore, the present invention, in view of the above problems, has as its object the provision of a optical submarine cable system which can easily cope with system expansion and also can simplify maintenance and operation of the system.

To attain the above object, the optical submarine cable system of the present invention is comprised of an optical cable comprised of both a main optical fiber pair and a sub optical fiber pair, a branching joint box for separating the sub optical fiber pair into a first branching optical fiber pair and a second branching optical fiber pair, a redundant optical cable comprised of the extended first and second branching optical fiber pairs and an end box mounted at the end of the redundant optical cable.

BRIEF DESCRIPTION OF THE DRAWINGS

The above object and features of the present invention will be more apparent from the following description of the preferred embodiment with reference to the accompanying drawings, wherein.

DESCRIPTION OF THE PREFERRED EMBODIMENT

Before describing the embodiment of the present invention, the prior art and the problems therein will be first described with reference to the related figures.

Figure 1:
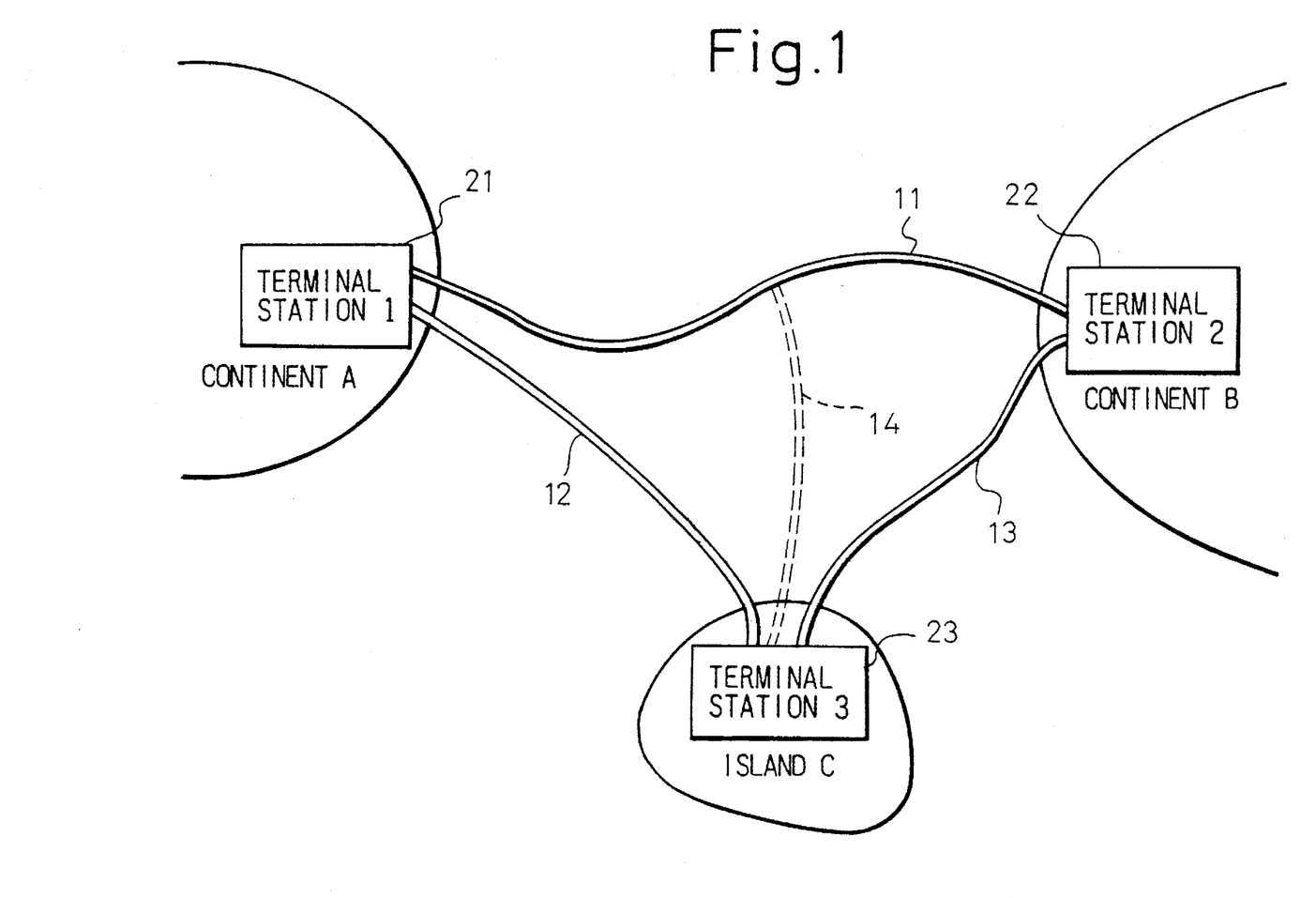
FIG. 1 illustrates one example of a typical construction of a optical submarine cable system.

FIG. 1 illustrates one example of a typical construction of a optical submarine cable system. Assuming a case where a long-distance communication is performed between a continent A and another continent B, a optical submarine cable 11 is laid between the two continents and the opposite ends of the cable 11 are connected to a first terminal station 21 and a second terminal station 22, respectively.

Taking as an example, a case where the above mentioned optical submarine cable system has already been constructed. In the above existing system, if it is required to newly construct a long-distance communication system between the continent A and an island C, first, an optical cable 12 is laid between the continent A and the island C, and then the opposite ends of the laid cable 12 are connected respectively to the first terminal station 21 and a third terminal station 23 of the island C.

If it is further required to newly construct a long-distance communication system between the island C and the continent B, another optical cable 13 is laid between the island C and the continent B, and then the opposite ends thereof are connected respectively to the second terminal station 22 and the third terminal station 23.

After the thus constructed optical submarine cable systems are put into practical use, assuming that some fault occurs in anyone of the above optical cables, for example, the optical cable 11, to carry out a troubleshooting, in the prior art, for example, a center portion of the optical cable 11 is cut on the sea bottom. One of the thus cut ends of the optical cable 11 is pulled up onto a ship to carry out the related troubleshooting by the use of test equipment. Thereafter, similar troubleshooting is carried out by pulling up the other cut end of the optical cable 11. After finishing the test, the faulty portion is repaired and then the cut ends of the optical cable are connected again by the use of an additional optical cable to restart normal operation. In the prior art, a series of the above mentioned maintenance procedures are required. Consequently, the aforementioned two problems inevitably result.

Figure 2:
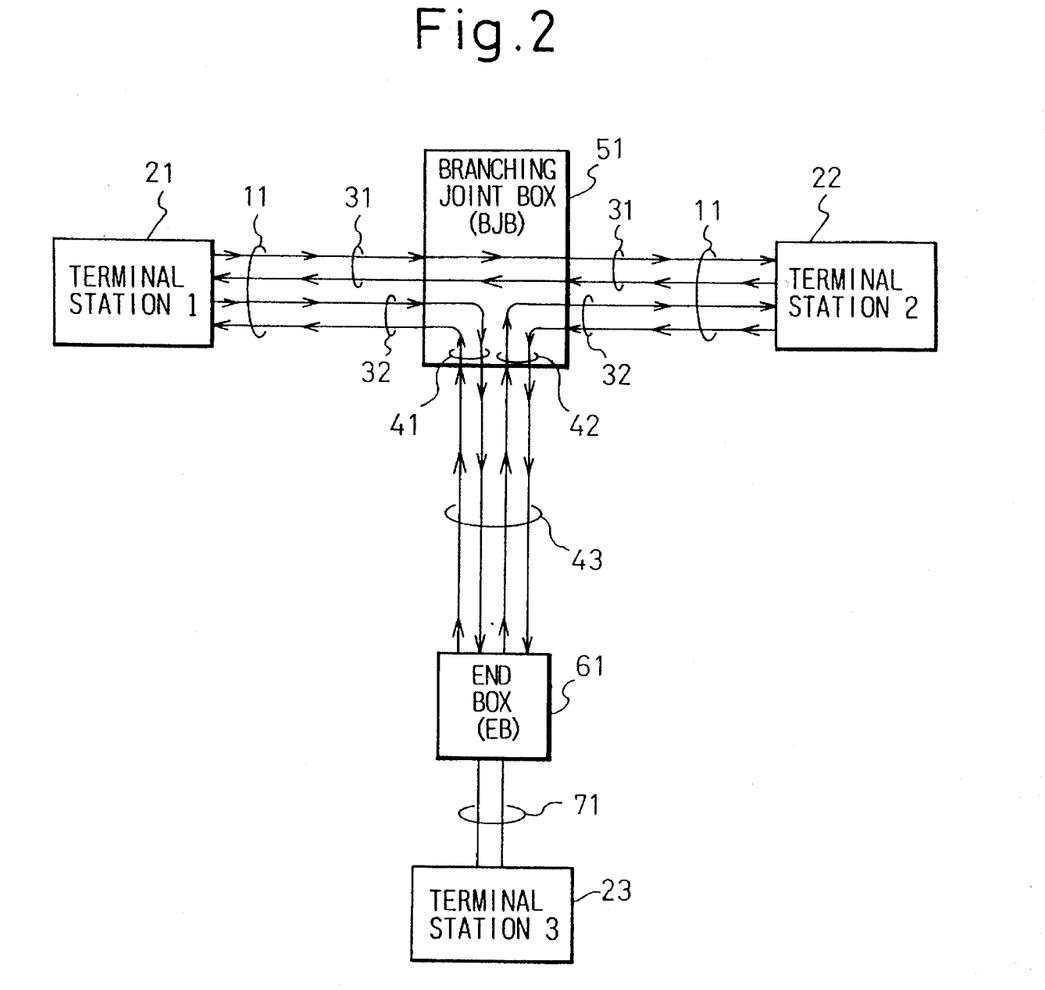
FIG. 2 is a view of the principle construction according to the present invention.

FIG. 2 is a view of the principle construction according to the present invention. The optical cable 11 according to the present invention contains therein, at least, a main optical fiber pair comprised of (an upstream line and a downstream line) 31 and a sub optical fiber pair (comprised of an upstream line and a downstream line) 32 which is in parallel with the main optical fiber pair 31. The main optical fiber pair 31 is operative to form an optical communication path between first and second terminal stations 21 and 22.

A branching joint box (BJB) 51 is inserted at a point in the optical cable 11. The inserted branching joint box 51 cuts the sub optical fiber pair 32 and separates the same into a first branching optical fiber pair 41 and a second branching optical fiber pair 42.

The branching joint box 51 is connected to a redundant optical cable 43 at one end thereof. The redundant optical cable 43 contains therein the extended first and second branching optical fiber pairs 41 and 42.

At the other end of the redundant optical cable 43, the first and second branching optical fiber pairs are terminated by an end box (EB) 61.

When it is required to construct a new communication system for a third terminal station 23 to communicate with the first terminal station 21 and/or the second terminal station 22, the end box 61, together with the redundant optical cable 43 is pulled up onto a ship. Further, one end of an optical cable 71 laid from the third terminal station 23 is connected to the end box 61 on the ship, and thereafter, both the end box 61 and the cable 71 are sunk.

Thus, an optical cable 14 is laid along a route shown by a broken line in FIG. 1, so that the terminal station "3" can communicate with the terminal station "1" and/or terminal station "2".

The construction of the optical cable 14 is much easier than the construction of both the optical cables 12 and 13, and also the construction cost and the construction period can be greatly reduced.

Further, when maintaining and operating the optical submarine cable system of FIG. 2, the end box 61, together with a part of the redundant cable 43, is pulled up onto a ship, to carry out a variety of tests through the end box 61. Note that, if the end box 61 has been provided with the optical cable 71, the cable 71 is also pulled up onto the ship.

Figure 3:
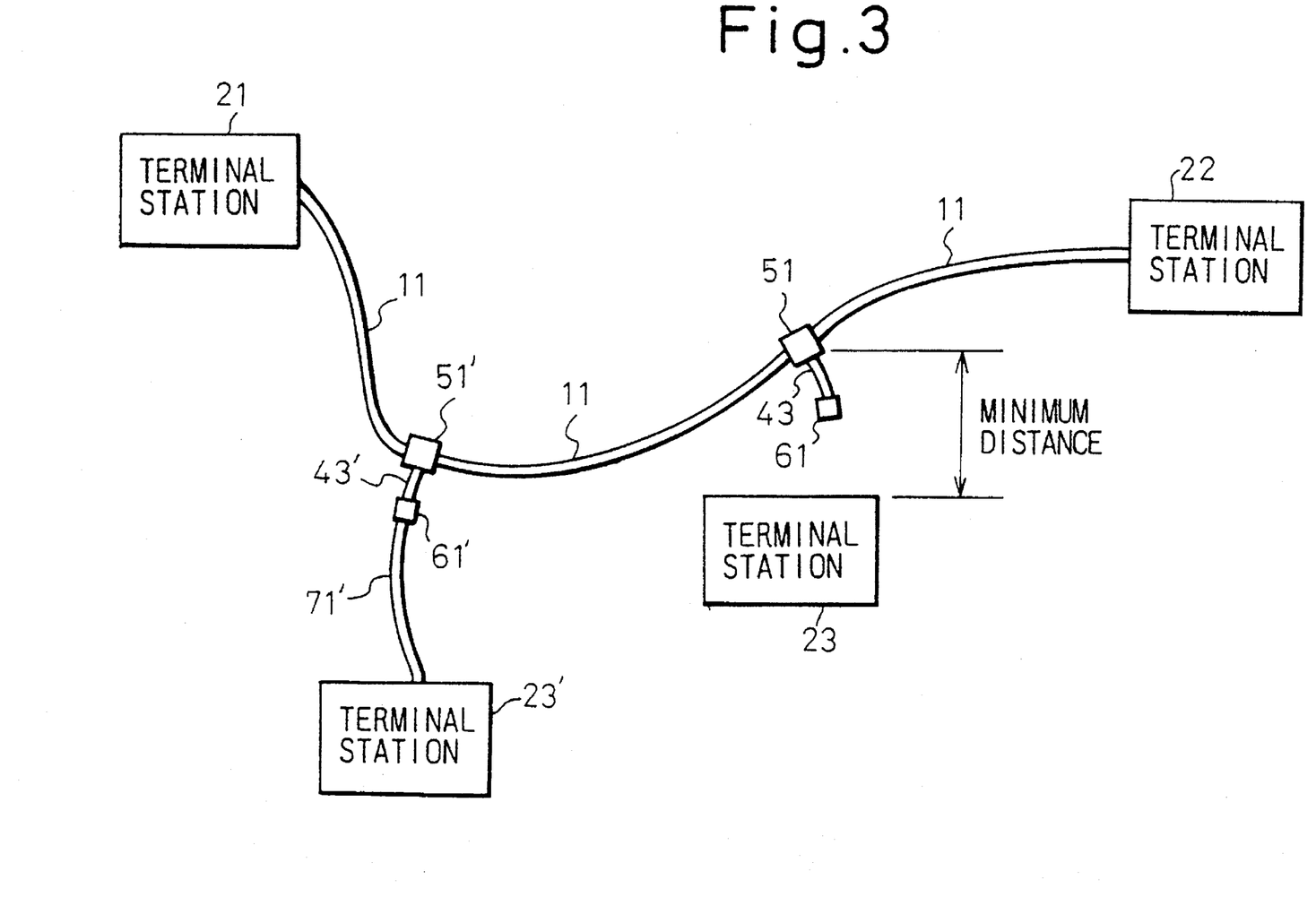
FIG. 3 is a view showing one preferred example of a location at which a branching Joint box is inserted.

FIG. 3 is a view showing one preferred example of a location at which the branching joint box is inserted. When the optical cable 11 is sunk on the sea bottom, it is important to determine where the branching joint box 51 is to be inserted beforehand into the very long optical cable 11. If the thus determined location for the insertion is wrong, there is a possibility that the related system expansion means, i.e., the member 51, 43 and 61 will be left unused for ever.

For this reason, an optimum location for inserting the system expansion means (51, 43 and 61) into the optical cable 11 is selected at a position, as shown in FIG. 3, close to the third terminal station 23 at a minimum distance, the third terminal station 23 being expected to perform, in the future, optical communication with at least one of the first and second terminal stations 21 and 22 which are both in operation. Note that, in FIG. 3, the positions where the system expansion has been installed, are referenced by numerals with primes (').

Figure 4:
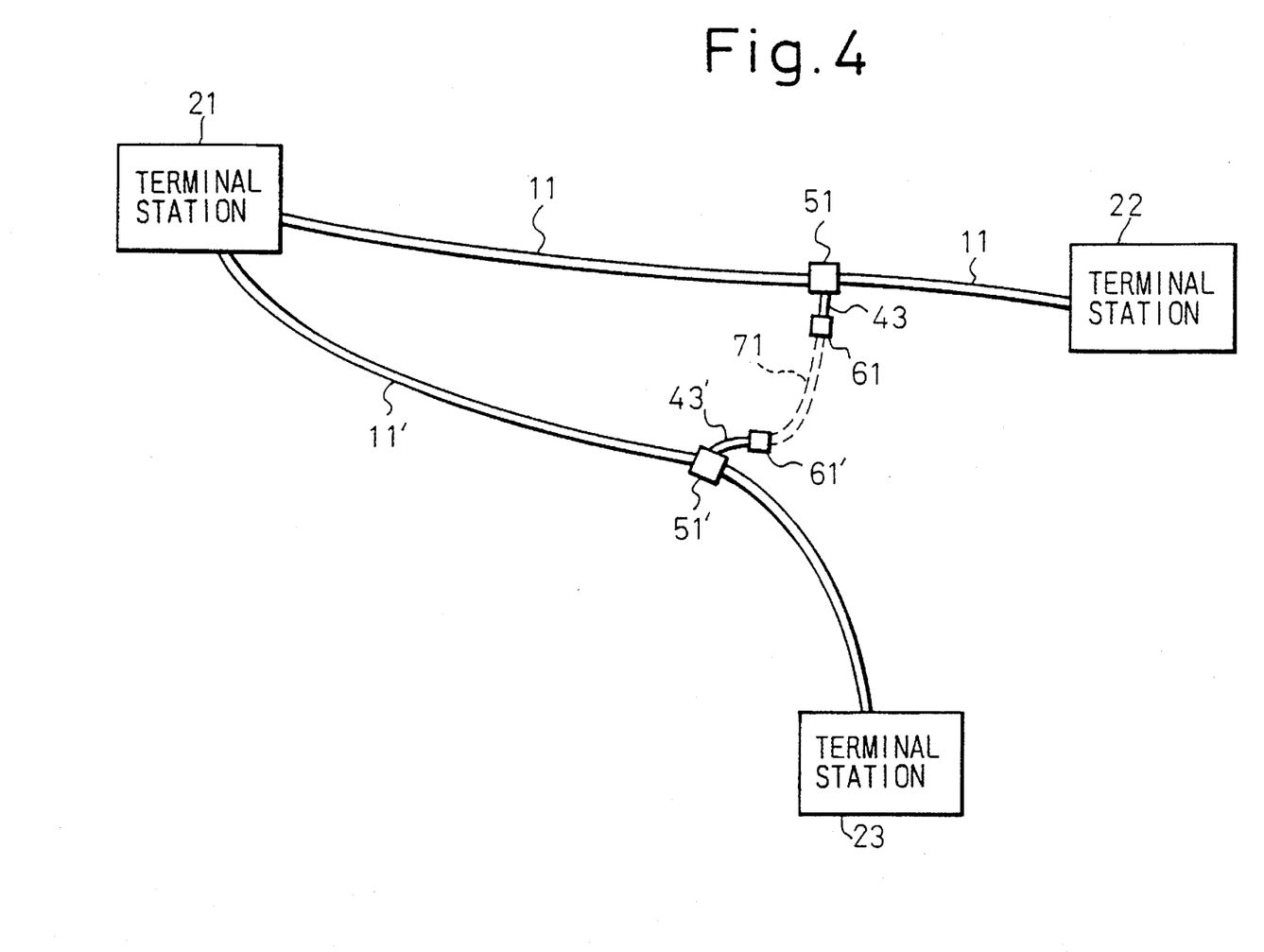
FIG. 4 is a view showing another preferred example of a location at which a branching joint box is inserted.

FIG. 4 is a view showing another preferred example of a location at which the branching joint box is inserted. It is assumed here that another optical cable 11' has been laid between the terminal stations 21 and 23, and further, the cable 11' is provided, at a certain portion thereof, with another branching joint box 51' having both another redundant optical cable 43' and another end box 61', where the cable 43' and box 61' are left unused.

With the system layout of FIG. 4, it is desirable to insert the branching joint box 51 into a part of the optical cable 11 at a position close to the branching joint box 51' connected to the optical cable 11' with which optical communication is expected.

Next, embodiment of the end box (EB) 61 will be explained below.

Figure 5:
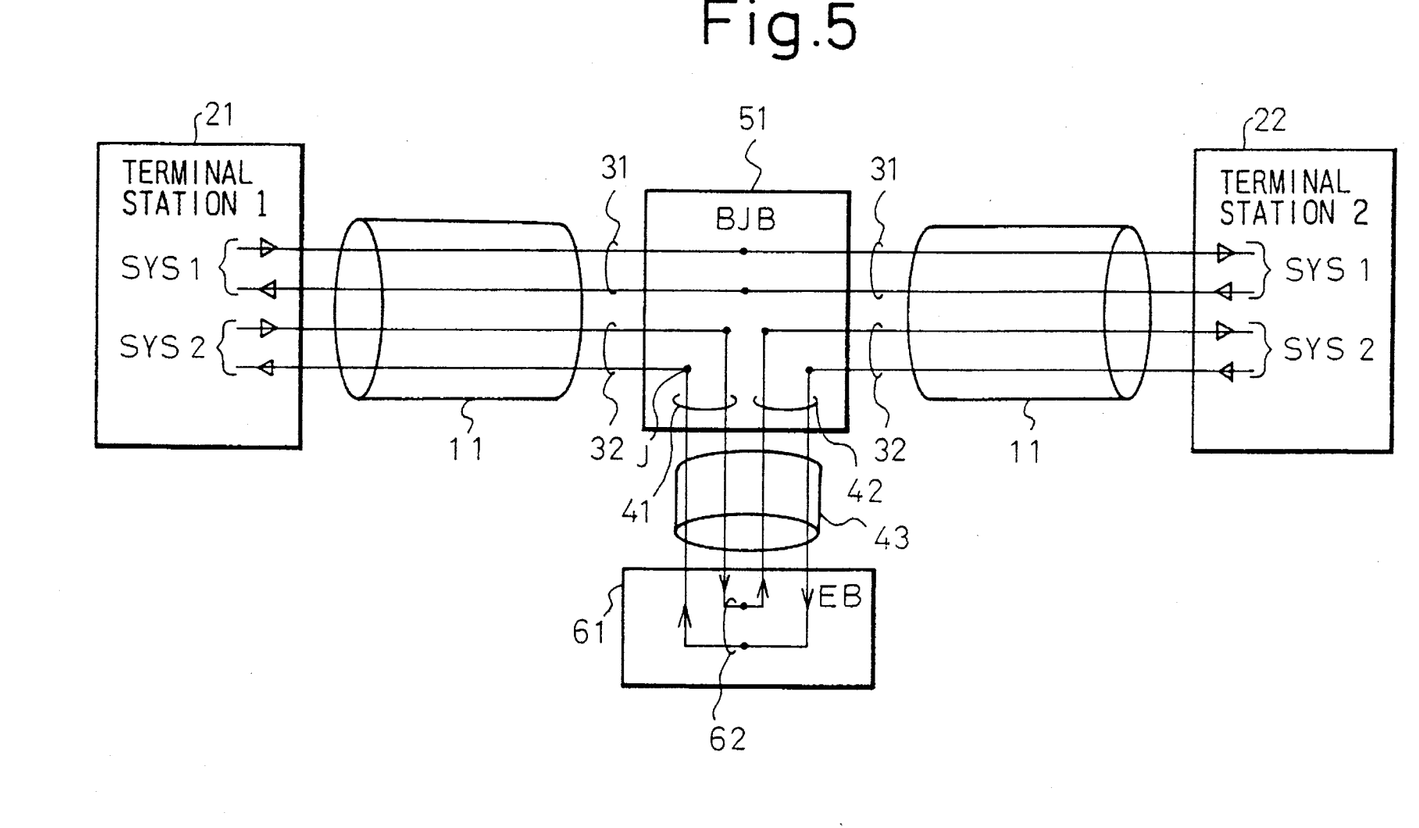
FIG. 5 represents a first mode of an end box.

FIG. 5 represents a first mode of the end box. In the first mode, an optical return loop 62 is formed inside the end box 61. When the first branching optical fiber pair 41 at the side of the terminal station 21 and the second branching optical fiber pair 42 at the side of the terminal station 22, are connected, by way of the optical return loop 62, an additional optical communication path (SYS2), as well as the inherent optical communication path (SYS1) through the main optical fiber pair 31, is formed between the terminal stations 21 and 22, so that the transmission capacity of the optical cable 11 can be doubled.

Incidentally, in the figure, each dot (J) denotes a connecting point of the optical fiber.

Figure 6:
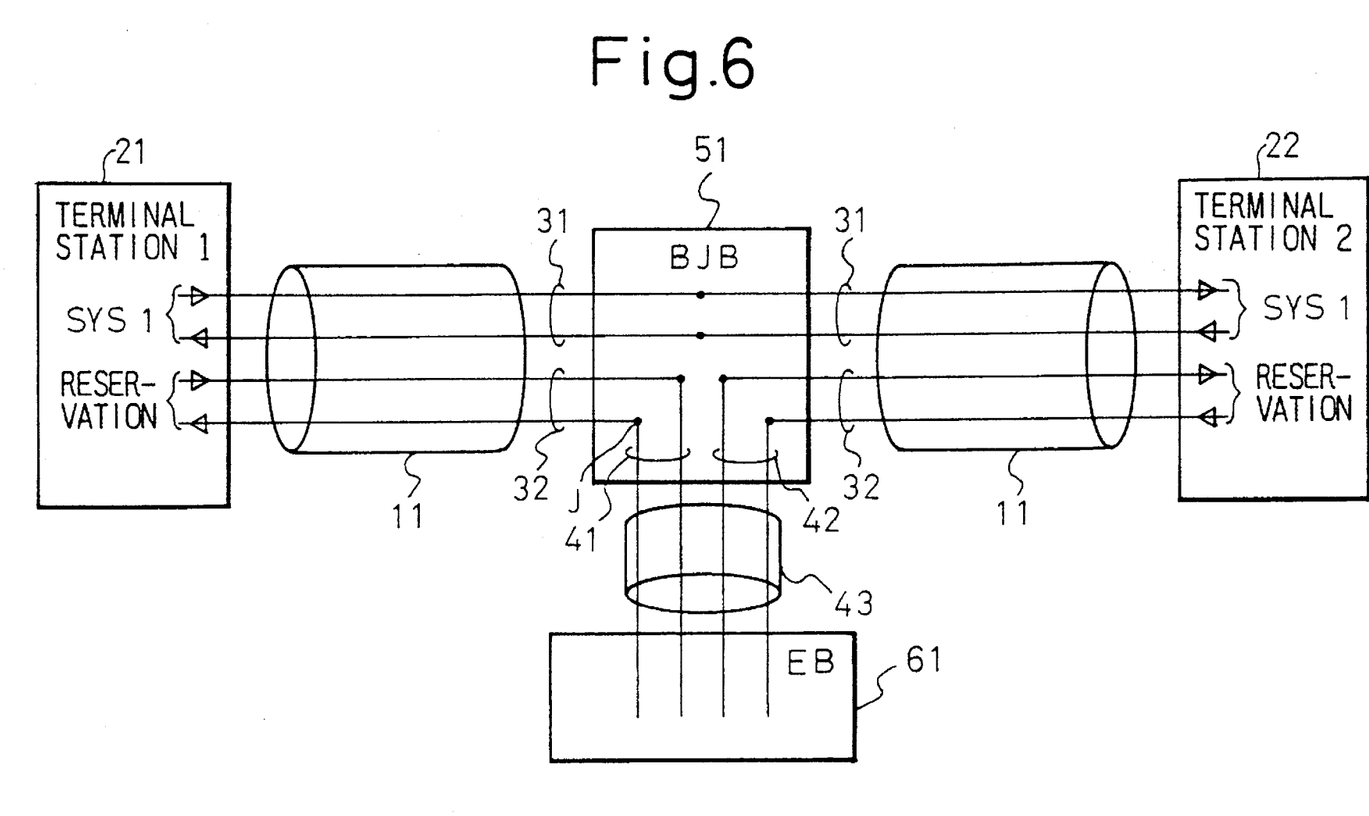
FIG. 6 represents a second mode of an end box.

FIG. 6 represents a second mode of the end box. In the second mode, the ends of the extended first and second branching optical fiber pairs 41 and 42 are left open, and therefore, the sub optical fiber pairs 32 are left unused. Accordingly, the sub optical fiber pairs 32 exist, in the second mode, as reserved lines for system expansion. Thus, the system expansion can be promptly commenced, when needed, by the use of the first branching optical fiber pair 41 and/or the second branching optical fiber pair 42 both currently being unused.

Figure 7:
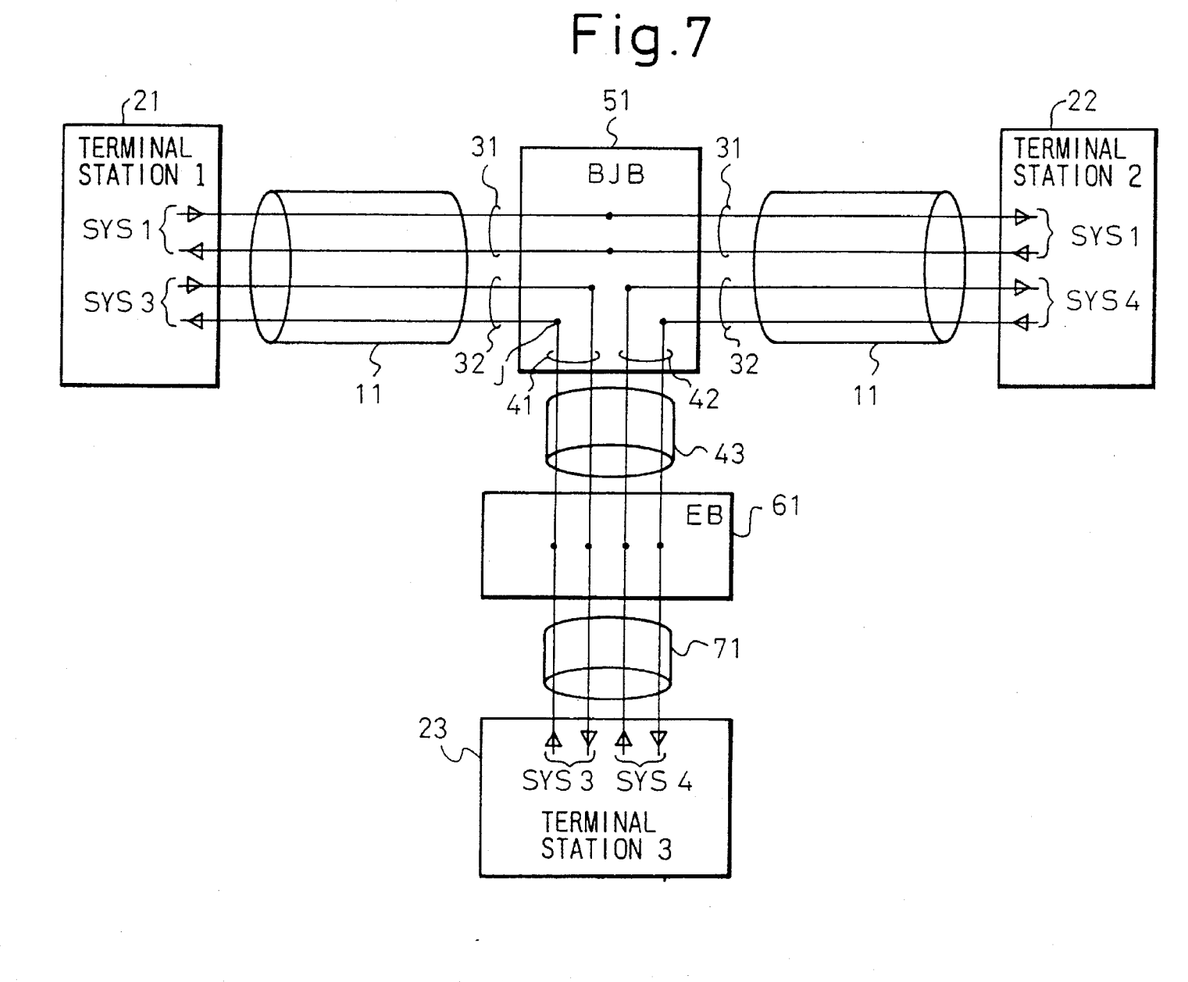
FIG. 7 illustrates a system in which an expansion has been completed.

FIG. 7 illustrates a system in which an expansion of the system has been completed. The end box 61 is connected, on a ship, with the end of the optical cable 71 and is sunk with the cable 71, after cutting the optical return loop 62 of the end box 61 (FIG. 5) in the case of the aforementioned first mode, while, in case of the second mode, the end box 61 (FIG. 6) is connected as it is with the cable 71.

Thus, an optical communication path (SYS3) can newly be installed between the terminal stations "1" and "3". Further, an optical communication path (SYS4) can newly be installed between the terminal stations "2" and "3".

Figure 8:
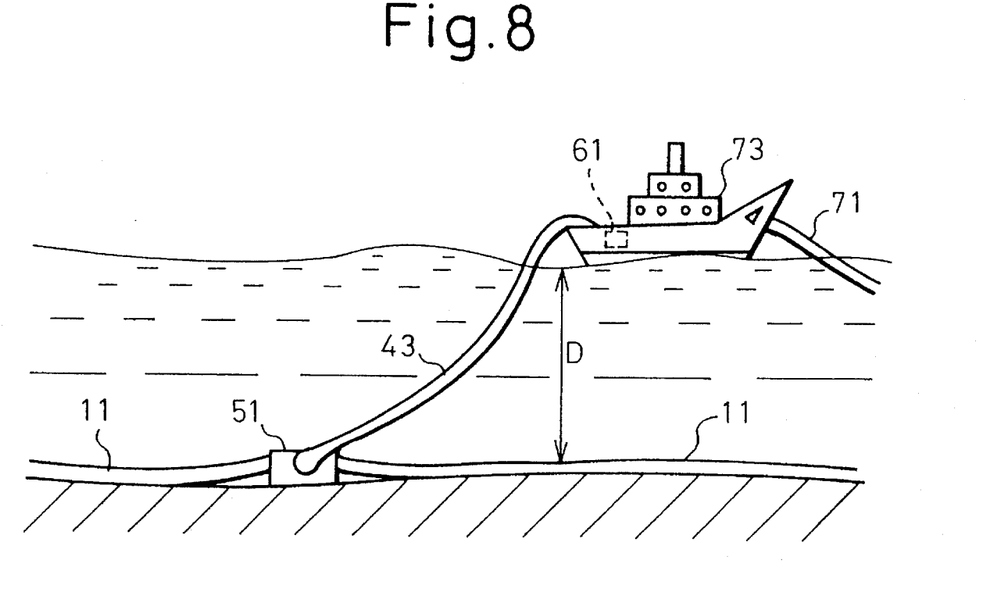
FIG. 8 illustrates a view of a construction of an optical cable connection.

FIG. 8 illustrates a view of the construction of the optical cable connection. When carrying out the construction of the system expansion of the aforementioned FIG. 7:

(i) the end box 61 sunk on the sea bottom is pulled up, together with the associated redundant optical cable 43, onto a ship 73;

(ii) a buoy (not shown) is drawn toward the ship 73 with the neighboring optical cable which is connected, at its end, with the buoy, and the cable 71 is connected, on the ship, with the end box 61; and (iii) after completion of the above construction (ii), the cables 43 and 71 and the end box 61 are sunk again on the sea bottom.

The length of the redundant optical cable 43 is about 2D so as to facilitate the construction of the connection of the optical cables, where the character D denotes, as shown in FIG. 8, a sea depth where the redundant optical cable 43 is laid. For example, if the sea depth is 100 m, the length of the cable 43 should be about 200 m. A length of 2D can maintain a natural deflection, in the sea, of the redundant cable 43.

The construction for the expansion of the optical submarine cable system can be completed through the above explained construction for the connection of the optical cables, and thereby, the expanded system can be put into practical use. After putting the expanded system into practical use, a variety of maintenance operations are required. Among these, in the past maintenance or recovery with respect to a fault of the optical cable has required difficult work.

Figure 9:
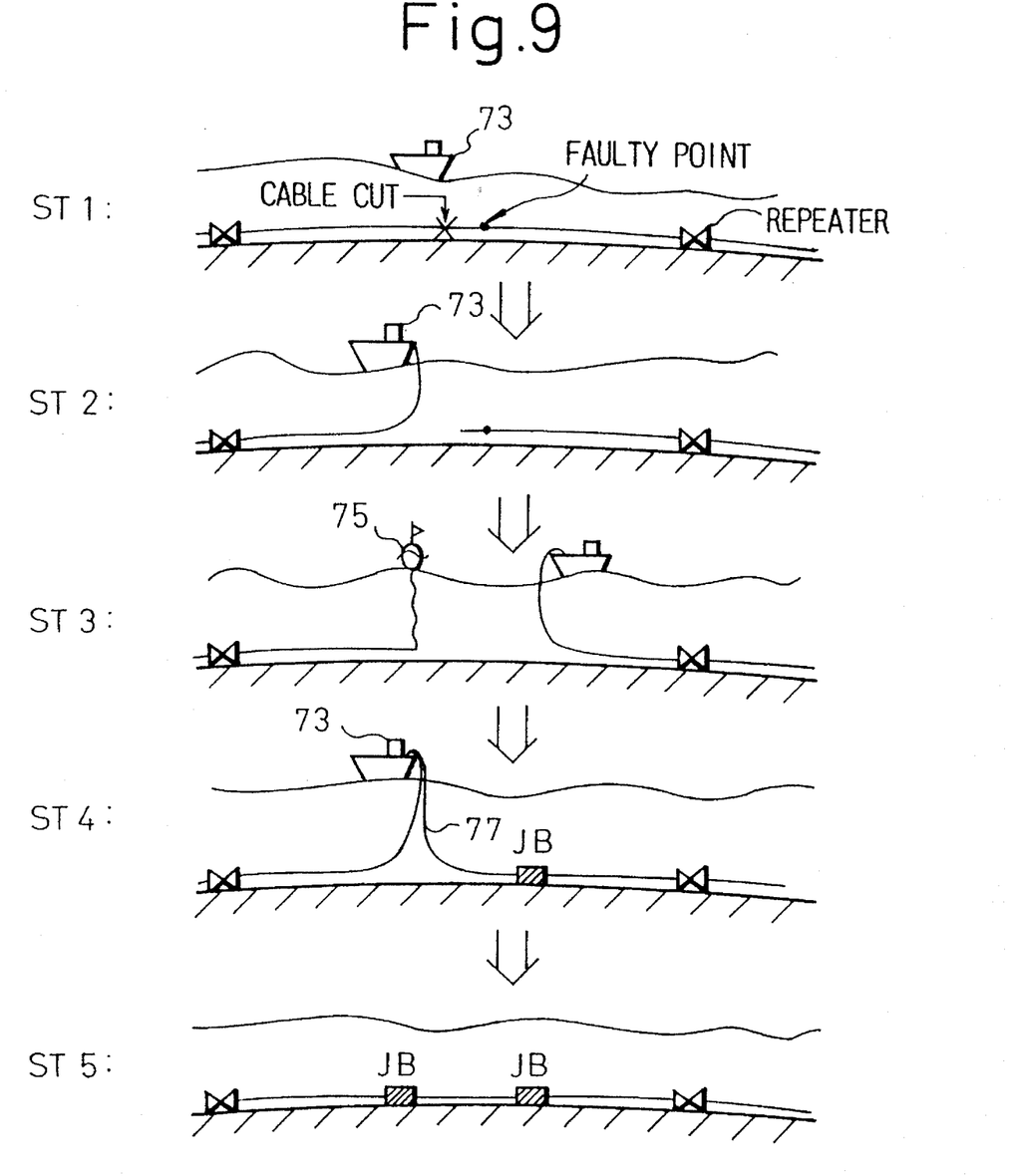
FIG. 9 illustrates prior art steps for carrying out a recovery of a faulty optical cable.

FIG. 9 illustrates prior art steps for recovery from a faulty optical cable. At step 1 (ST1), a faulty point is estimated beforehand to be located at the illustrated point (x) between the repeaters or along the optical cable, and the cable is cut at the portion in the vicinity of the predicted faulty point.

At step 2 (ST2), one of the ends of the thus cut optical cable is pulled up on the ship 73, and a test is carried out through the thus pulled up end by the use of test equipment. If a faulty point is found, the faulty portion is cut off.

At step 3 (ST3), the tested or repaired optical cable is thrown into the sea, together with a buoy 75 connected at the end of the cable, and thereafter, the end of the thus cut other optical cable is pulled up on the ship 73 and a test is carried out by the test equipment. If a faulty point is found, the faulty portion is cut off.

The thus cut off portion is compensated for by an additional optical cable via two joint boxes.

At step 4 (ST4), the above mentioned additional cable is referenced by 77 and the above-mentioned joint box is referenced by JB. In this step 4, the additional cable 77 and the previously mentioned optical cable connected to the previously mentioned buoy 75 are connected via another joint box (JB).

At step 5 (ST5), the optical cable and the additional cable 77, together with the above mentioned other joint box, are sunk on the sea bottom, so that the recovery work from the fault is completed.

As apparent from the above explanation, in the prior art, a lot of work and a long period of time are needed for maintenance such as the recovery from a fault.

However, according to the submarine optical cable system of the present invention, the recovery from a fault in the optical cable 11 is accomplished very easily and in a very short time.

Figure 10:
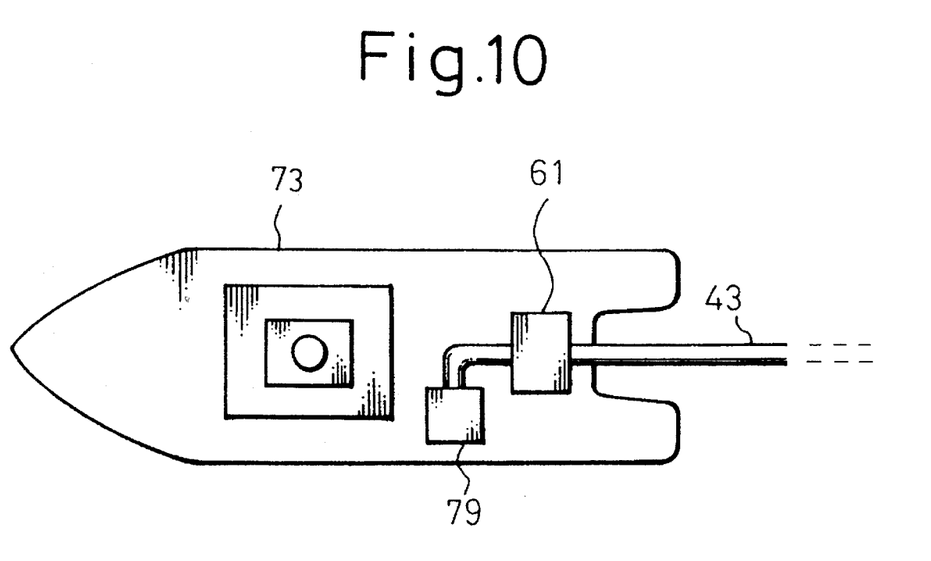
FIG. 10 illustrates a part of work involved in recovering from a fault according to the present invention.

FIG. 10, which is an overhead plan view of the ship 73, illustrates a part of recovery work from the fault according to the present invention. When the recovery from a fault is to be achieved, the ship moves to the location of the end box 61. (Note that the location has been recorded by the use of, e.g., a Global Positioning System (GPS)). Then the end box 61 is pulled up, together with the redundant optical cable 43, onto the ship 73 to carry out a test thereon by using test equipment 79. In this case, as apparent with reference to FIG. 6, the test of the optical cable connected to the terminal station "1" (21) and the test of the optical cable connected to the terminal station "2" (22) can be carried out consecutively on the ship 73 merely by switching the connection of the test equipment 79 with the extended first branching optical fiber pair 41 or the extended second branching optical fiber pair 42.

In this case, with reference to FIG. 6, it seems that such testing is meaningless since the test is carried out on only the sub optical fiber pair 32 at the reservation side, and therefore, the test is not applied to the main optical fiber pair 31. However, it should be noted that a fault such as a disconnection of the cable, due to, e.g., hooking of the cable by a fishing net from a fishing boat, generally occurs with respect to both the main and sub optical fiber pairs 31 and 32 simultaneously. Therefore, the faulty portion can surely be specified by monitoring the sub optical fiber pair 32 alone, and the faulty portion can be recovered.

With reference to FIG. 9 again, it can be understood that the submarine optical cable system of the present invention is also applicable to the existing submarine optical cable system of the prior art. As seen at step 5 (ST5), i.e. the last step, of FIG. 9, two joint boxes (JB) are arranged. If either one or both of the joint boxes is or are replaced by the aforesaid branching joint box or boxes (BJB) 51, each having both the aforesaid redundant optical cable 43 and end box (EB) 61 (see FIG. 2), the submarine optical cable system of the present invention can be set up. Namely, it will be sufficient to connect the cut optical cables with the branching joint box 51 at step 3 and/or step 4 of FIG. 9.

Thus, it will be possible, if recovery work is carried out for recovery from some fault, to change the system arrangement to match that of the present invention by taking advantage of the above recovery work.

Finally, a measure regarding the use of power supplies will be described below. In recent years, the capabilities of optical fibers have drastically increased, so that it will eventually become possible to realize an optical communication path of several thousands of kilometers in length without incorporating any repeater therein in the future. Namely, a non-repeatered optical submarine cable system will become possible. In such a non-repeatered optical submarine cable system, a power supply will no longer be needed for driving the conventional repeaters.

However, for the time being, the conventional repeatered optical submarine cable systems will still be employed widely, with many repeaters being inserted into the cable at regular intervals. In such a repeatered optical submarine cable system, when the optical cable 71 including therein a power supply line is going to be connected to the existing optical cable 11 including therein another power supply line, as shown in FIG. 7, it is necessary to turn off the power supply line of the existing optical cable 11 momentarily to establish a connection of the power supply line of the cable 11 with the power supply line of the cable 71. Because of this, the usual optical communication must necessarily be disconnected at least during the construction for the connection of the above mentioned power supply lines. Thus, it is desirable for such disconnection of the usual optical communication to be avoided. One example of a measure for realizing this is as follows.

Figure 11:
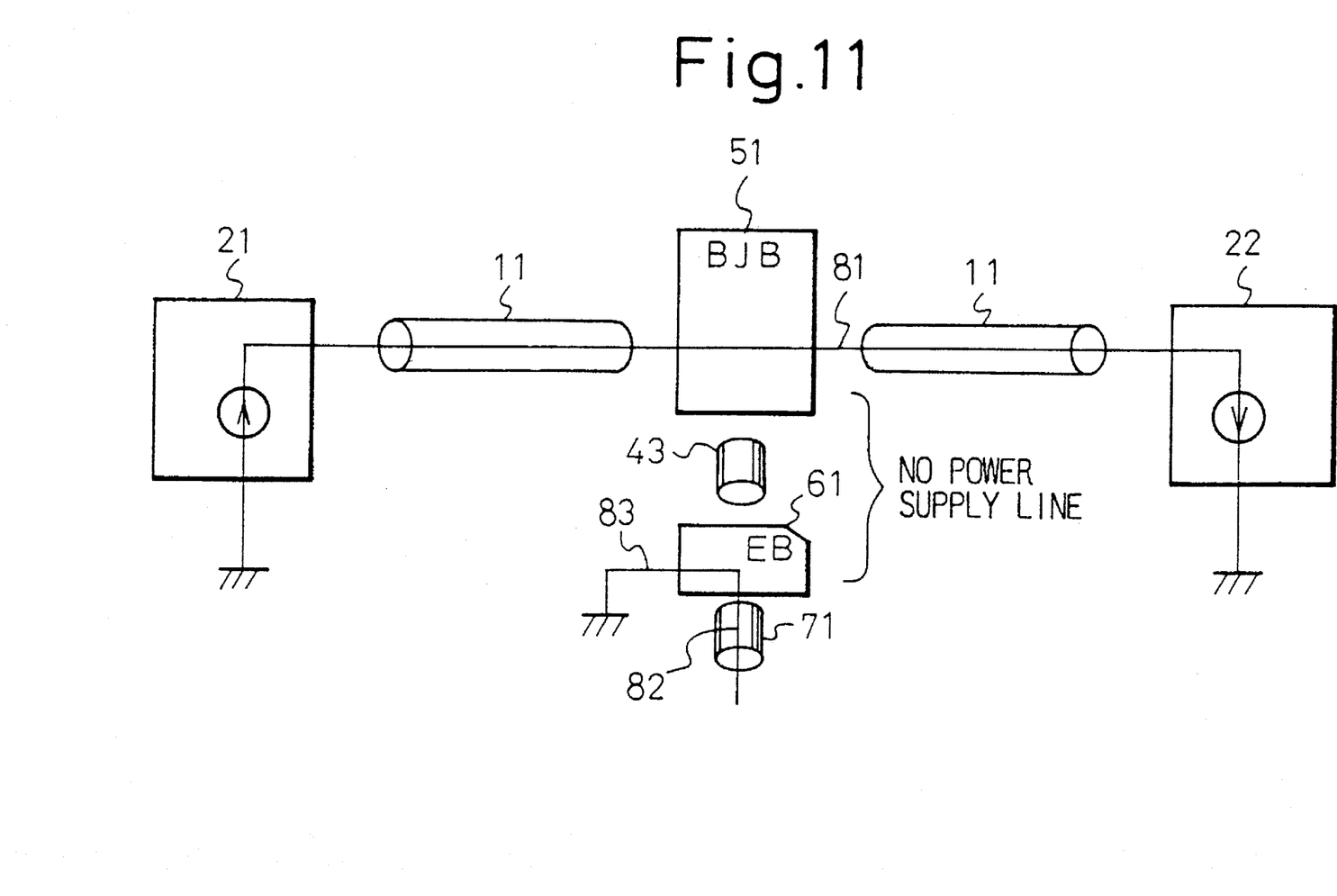
FIG. 11 shows an example of a construction of a power supply circuit according to the present invention.

FIG. 11 shows an example of the construction of a power supply circuit according to the present invention. Note here that, in this figure, no optical fiber pair is illustrated but only the power supply lines are illustrated. In the figure, reference numeral 81 represents a power supply line built into the existing optical cable 11. A power supply line built into the optical cable 71 is referenced by numeral 82.

In the present invention, no power supply line is built in along the route of the branching joint box 51, the redundant optical cable 43 and the end box 61. However, it is sufficient to mount a submarine grounding terminal 83 at a part of the end box 61.

By the above arrangement, the ground of the power supply line 82 built into the optical cable is completed by merely connecting the same to the submarine grounding terminal 83. In this case, there is no chance to make contact with the power supply line 81 built into the optical cable 11. Therefore, there is no need to disconnect the usual optical cable that is in use.

As explained above, according to the present invention, a optical submarine cable system can be realized which can flexibly cope with an expansion of the system and also can simplify the maintenance and operation of the system.

I claim:

1. An optical submarine cable system comprising:

an optical cable including at least a main optical fiber pair for forming an optical communication path between a first terminal station and a second terminal station, and a sub optical fiber pair laid in parallel with said main optical fiber pair;

branching joint box means inserted into said optical cable, where said optical cable is expected to connect with another optical communication means, for separating said optical cable by cutting said sub optical fiber pair where the branching joint box is inserted, into a first branching optical fiber pair and a second branching optical fiber pair;

a redundant optical cable, one end of which is connected to said branching joint box means, containing therein both an extension of said first branching optical fiber pair and an extension of said second branching optical fiber pair; and end box means for terminating, at an other end of said redundant optical cable, both of said extended first and second branching optical fiber pairs.

2. An optical submarine cable system as in claim 1, wherein said branching joint box means is inserted into said optical cable at a location close to a third terminal station at a minimum distance therefrom, said third terminal station being expected to carry out, at a later time, optical communication with at least one of said first and second terminal stations.

3. An optical submarine cable system as in claim 1, wherein said branching joint box means is inserted into a part of said optical cable at a location close to another branching joint box means inserted in another optical cable with which another optical communication path is expected.

4. An optical submarine cable system as in claim 1, wherein an optical return loop is formed in said end box means and connected between said extended first branching optical fiber pair and said extended second branching optical fiber pair, additional optical communication path between said first terminal station and said second terminal station being formed.

5. An optical submarine cable system as in claim 1, wherein ends of said extended first branching optical fiber pair and said extended second branching optical fiber pair are left open in said end box means.

6. An optical submarine cable system as in claim 1, further comprising another optical cable laid between said end box means and a third terminal station or still another said optical cable to form an optical communication path between them.

7. An optical submarine cable system as in claim 6, wherein a first optical communication path is formed between said third terminal station and said first terminal station through said first extended branching optical fiber pair, and/or a second optical communication path is formed between said third terminal station and said second terminal station through said second extended branching optical fiber pair.

8. An optical submarine cable system as in claim 1, wherein test equipment is connected to said extended first branching optical fiber pair or said extended second branching optical fiber pair via said end box means after set end box has been pulled up onto a ship.

9. An optical submarine cable system as in claim 1, wherein a length of said redundant optical cable is about twice the sea depth where the redundant optical cable is laid.

10. An optical submarine cable system as in claim 1, wherein no power supply line is built in along the route of said branching joint box means, said redundant optical cable and said end box means, a submarine grounding terminal being mounted at a part of said end box means.

* * * * *